United States Patent
Strasser et al.

(10) Patent No.: US 11,979,968 B2
(45) Date of Patent: May 7, 2024

(54) SPRAY COOLING FURNACE ELECTRODES WITH A COOLING LIQUID THAT CONTAINS SURFACTANTS

(71) Applicant: CHEMTREAT, INC., Glen Allen, VA (US)

(72) Inventors: Joseph S. Strasser, Evergreen, CO (US); Jeffrey R. Tanski, Concord Township, OH (US)

(73) Assignee: CHEMTREAT, INC., Glen Allen, VA (US)

( * ) Notice: Subject to any disclaimer, the term of this patent is extended or adjusted under 35 U.S.C. 154(b) by 712 days.

(21) Appl. No.: 17/255,272

(22) PCT Filed: Oct. 15, 2019

(86) PCT No.: PCT/US2019/056317
§ 371 (c)(1),
(2) Date: Dec. 22, 2020

(87) PCT Pub. No.: WO2020/081559
PCT Pub. Date: Apr. 23, 2020

(65) Prior Publication Data
US 2021/0176835 A1    Jun. 10, 2021

Related U.S. Application Data

(60) Provisional application No. 62/745,729, filed on Oct. 15, 2018.

(51) Int. Cl.
*H05B 7/12*      (2006.01)
*C21B 13/12*    (2006.01)
(Continued)

(52) U.S. Cl.
CPC ............ *H05B 7/12* (2013.01); *C21B 13/12* (2013.01); *C21C 5/52* (2013.01); *F27B 14/06* (2013.01);
(Continued)

(58) Field of Classification Search
CPC ......... C21B 13/12; C21C 5/52; C21C 5/5211; C21C 7/0075; F27B 14/06; F27B 14/08;
(Continued)

(56) References Cited

U.S. PATENT DOCUMENTS 1,000,761 A    8/1911   Snyder
3,777,040 A   12/1973   Gell et al.
(Continued)

FOREIGN PATENT DOCUMENTS

CN    107841291 A    3/2018
DE      3809361 A1   9/1989
(Continued)

OTHER PUBLICATIONS

Translation of Cited CN107841291 (Year: 2018).*
(Continued)

*Primary Examiner* — Dana Ross
*Assistant Examiner* — Joseph W Iskra
(74) *Attorney, Agent, or Firm* — Oliff PLC (57) ABSTRACT

A method for cooling furnace electrodes using a cooling liquid containing surfactants. This method can be applied to electrodes used in electric arc furnaces and ladle metallurgy furnaces. The method can involve spraying the cooling liquid onto the electrode, thereby lowering the temperature of the electrode and reducing electrode consumption.

14 Claims, 5 Drawing Sheets

(51) Int. Cl.
*C21C 5/52* (2006.01)
*F27B 14/06* (2006.01)
*F27B 14/08* (2006.01)
*F27D 9/00* (2006.01)

(52) U.S. Cl.
CPC ............... *F27B 14/08* (2013.01); *F27D 9/00* (2013.01); *F27B 2014/0837* (2013.01); *F27D 2009/0016* (2013.01)

(58) Field of Classification Search
CPC ............... F27B 2014/0837; F27B 3/24; F27D 2009/0016; F27D 9/00; H05B 7/12; Y02P 10/20; Y02P 10/25; C09K 5/00
USPC .......................................................... 373/60
See application file for complete search history.

(56) References Cited

U.S. PATENT DOCUMENTS

| | | | |
|---|---|---|---|
| 3,806,698 A | 4/1974 | Hare et al. | |
| 3,964,924 A | 6/1976 | Kurzeja | |
| 4,135,912 A * | 1/1979 | Matthew | C22B 11/021 75/10.29 |
| 4,287,381 A | 9/1981 | Montgomery | |
| 4,439,491 A | 3/1984 | Wilson | |
| 4,476,687 A | 10/1984 | Conklin et al. | |
| 4,487,804 A | 12/1984 | Reven | |
| 4,488,312 A | 12/1984 | Montgomery et al. | |
| 4,575,856 A | 3/1986 | Persson | |
| 4,726,995 A | 2/1988 | Chiu | |
| 4,852,120 A * | 7/1989 | Udo | H05B 7/12 373/95 |
| 4,941,149 A | 7/1990 | Nakamoto et al. | |
| 5,115,184 A | 5/1992 | Arthur et al. | |
| 5,795,539 A | 8/1998 | Sakurai et al. | |
| 5,923,173 A * | 7/1999 | Yu | H04N 3/20 348/E3.039 |
| 5,925,173 A | 7/1999 | Frost et al. | |
| 8,869,564 B2 | 10/2014 | Gross et al. | |
| 9,452,306 B1 | 9/2016 | Cunigan | |
| 10,694,592 B1 | 6/2020 | Strasser et al. | |
| 11,140,755 B2 | 10/2021 | Strasser et al. | |
| 11,653,426 B2 | 5/2023 | Strasser et al. | |
| 2003/0035956 A1 | 2/2003 | Hisashi et al. | |
| 2006/0034342 A1 | 2/2006 | Kark | |
| 2006/0193364 A1 * | 8/2006 | Shiraishi | F27D 11/08 373/93 |
| 2013/0099169 A1 | 4/2013 | Pellet et al. | |
| 2013/0148686 A1 | 6/2013 | Coleman et al. | |
| 2013/0279534 A1 | 10/2013 | Coleman et al. | |
| 2014/0130636 A1 | 5/2014 | Lundh et al. | |
| 2016/0123667 A1 | 5/2016 | Mizutani et al. | |
| 2017/0280519 A1 | 9/2017 | Lasorda | |
| 2018/0156540 A1 | 6/2018 | Cobos | |
| 2020/0239980 A1 | 7/2020 | Carabin et al. | |

FOREIGN PATENT DOCUMENTS

| | | |
|---|---|---|
| DE | 19608532 A1 | 8/1997 |
| EP | 0 223 205 A1 | 5/1987 |
| EP | 0 309 583 A1 | 4/1989 |
| EP | 0334007 A1 | 9/1989 |
| EP | 1 591 738 A1 | 11/2005 |
| GB | 1 134 023 A | 11/1968 |
| GB | 1386611 A | 3/1975 |
| JP | H09-190881 A | 7/1997 |
| WO | 1998/043030 A1 | 10/1998 |
| WO | 2012/003228 A2 | 1/2012 |

OTHER PUBLICATIONS

Jul. 14, 2021 Notice of Allowance issued in U.S. Appl. No. 16/871,179.
Dec. 8, 2021 Extended Search Report issued in European Patent Application No. 19 874 104.3.
Dec. 8, 2021 Extended Search Report issued in European Patent Application No. 19 874 042.5.
Nov. 27, 2019 International Search Report issued in International Patent Application No. PCT/US19/49335.
Nov. 27, 2019 Written Opinion of the International Searching Authority issued in International Patent Application No. PCT/US19/49335.
"Protective Coating for Graphite Electrodes". Graphite Cova GmbH. (accessible at least as early as Feb. 22, 2016).
Dec. 27, 2019 International Search Report issued in International Patent Application No. PCT/US2019/056317.
Dec. 27, 2019 Written Opinion issued in International Patent Application No. PCT/US2019/056317.
Nov. 9, 2023 U.S. Office Action issued U.S. Appl. No. 18/135,433.

* cited by examiner

SPRAY COOLING FURNACE ELECTRODES WITH A COOLING LIQUID THAT CONTAINS SURFACTANTS

CROSS-REFERENCE TO RELATED APPLICATIONS

This application claims the benefit of U.S. Provisional Application No. 62/745,729, filed Oct. 15, 2018.

FIELD OF DISCLOSURE

This disclosure relates to enhancing the cooling capabilities for electrodes including electric arc furnace (EAF) electrodes and ladle metallurgy furnace (LMF) electrodes, or any water cooled electrodes that are used in the steel making process. Sidewall oxidation of the electrode can be reduced and thus result in extended electrode life.

BACKGROUND

EAF steel producers use electrical energy to melt raw materials to produce 1 ton to 420 metric tons of steel in vessels. Electrical energy can be delivered to the furnace as alternating current (AC) or direct current (DC). The electrical power delivered to the raw materials can be as high as 200 MWh in the case of the largest EAF vessels. This power supply creates an electrical arc that creates the necessary heat to raise the batch of steel to temperatures as high as 1800° C. and to allow for further refinement and processing in the LMF and subsequent casting and forming operations.

The electrical power is delivered to the steel through graphite electrodes. Graphite is the material of choice for electrodes due to the following characteristics: low coefficient of thermal expansion (CTE), high tensile strength, high specific resistance, electrical resistance that is relatively independent of temperature, and nobility (cathodic to other materials).

Electrodes are consumables utilized in the electrical steel making process and account for a substantial cost for the steel maker. The environment in the electric arc furnace is violent and harsh, and causes consumption of electrodes in a range of approximately 1 kg/metric ton of steel produced to 2.5 kg/metric ton. Causes of consumption include: electrical arc at the electrode tip where localized temperature is approximately 3000° C.; breakage due to movement of raw materials; thermal shock and subsequent loss of electrode tip; and oxidation of the electrode surfaces along the column due to the harsh furnace environment. Oxidation of the electrode creates the conical shape of electrodes that are in use and can account for nearly 50% of the electrode consumption.

For decades, steel producers and furnace electrode producers have attempted to reduce the oxidation rate of the graphite and carbon electrodes through many different means. One example is to use electrodes that have surfaces coated with layers formed from graphite, metal, aluminum alloys, and pure aluminum. However, these coatings are only applied once (e.g., only during the manufacturing of the electrodes), and the coatings are susceptible to chemical and physical damage that renders them ineffective. Thus, these types of coatings can have short useful life spans.

Changes in the electrode manufacturing process, in electrode coupling technology, in the recipe for the graphite electrodes, and in operational procedures like foamy slag have reduced electrode consumption substantially since 1985 when electrode consumption was between 5 to 6 kg/metric ton of steel to 1 to 2.5 kg/metric ton of steel in 2018. While this has been an impressive reduction, market forces have heightened sensitivity to the consumption rate. Even incremental decreases in consumption rate have a substantial impact to the steel maker.

The oxidation of the electrode is a chemical reaction. The rate of oxidation of the electrode increases with increasing temperatures because the reactant molecules have more kinetic energy at higher temperatures. The reaction rate (i.e., oxidation rate) is governed by the Arrhenius equation which in almost all cases shows an exponential increase in the rate of reaction as a function of temperature.

$$k = \frac{-Ea}{k_B T}$$

Where: k=the rate constant
$k_B$=Boltzmann constant
T=absolute temperature
A=a constant for each chemical reaction
$E_a$=the activation energy
R=the universal gas constant Therefore, many designs have been developed to cool the bulk of the electrode (i.e., lower the temperature of the electrode), but have been abandoned due to safety concerns. Applying cooling water to the electrode below the molten steel bath creates a very dangerous condition in the case of an electrode break or the failure of the cooling water channel. The release of cooling water below the steel bath creates an explosion due to the rapid expansion as the water changes phase from water to steam with an approximate volumetric expansion of 1,100 times. Electrodes used in commercial steel making are currently composed exclusively of graphite and do not contain cooling water channels.

To further reduce oxidation of the electrode, spray cooling was introduced to the industry and specific designs to cool the electrode using circular spray headers with multiple vertical spray headers located at multiple locations around the circumference of the electrode.

Investigation of water application has been employed to enhance safety as well as mitigate oxidation of the electrode. Enhancements, such as providing air to atomize the water as it is discharged from the spray nozzle, have been evaluated. Electrode cooling water flow, in some facilities, varies depending upon the furnace conditions, providing an additional level of safety.

SUMMARY

One objective of the present disclosure is to reduce the oxidation of the electrode during the steel making process.

An aspect of the disclosure is a method for cooling a furnace electrode, including: (i) mixing a surfactant with water to form a cooling liquid so that the surfactant is present in the cooling liquid in an amount in a range of from 10 mg/l to 5,000 mg/l, and (ii) spraying at least a surface of the furnace electrode disposed outside a furnace with the cooling liquid to cool the furnace electrode.

DETAILED DESCRIPTION OF EMBODIMENTS

The disclosed cooling methods may be used to cool any high-temperature furnace electrodes that are conventionally cooled using water. In contrast to known techniques, and as disclosed herein, the process of adding a surfactant to the spray water system surprisingly can reduce oxidative consumption of the electrode. The disclosed cooling methods may be used to cool graphite electrodes in furnaces and/or steel making processes such as electric arc furnace, induction furnace, vacuum induction melting, argon oxygen decarburization, ladle furnace, vacuum oxygen degassing, vacuum degassing, vacuum arc remelting, and electro slag remelting. When the furnace electrode is in use, a surface of the furnace electrode can have a temperature of at least 700° C., at least 1000° C., at least 1200° C., at least 1800° C., or at least 3000° C.

Water has a surface tension of 73.2 dynes/cm or 73.2 mN/m at 25° C. at an interfacial boundary with air. This surface tension is higher compared to that for other liquids. Additionally, this surface tension varies slightly between 0° C. and 100° C., dropping from 75.6 mN/m to 56.9 mN/m over the range. This surface tension exists because water is a polar molecule due to a bond dipole moment pointing from each hydrogen atom to the oxygen atom in the water molecule. The cumulative bond dipole moment creates a slightly negative charge at the oxygen atom and a slightly positive charge at each hydrogen atom. This polarity of water can create a large contact angle which is measured through the liquid, where a liquid-vapor interface meets a solid surface. High contact angles indicate low wettability for a given solid surface. As a result, water may not spread evenly on the surface of the hot electrode to uniformly cool the electrode. Therefore, using water alone for cooling the electrodes has its shortcomings.

As used herein, the term "surfactant" refers to a substance which tends to reduce the surface tension of a liquid in which it is dissolved, and the singular term "surfactant" can refer to either one surfactant or combinations of two or more surfactants. Mixing a surfactant, as an additive, with water to form a cooling liquid can reduce the surface tension of water as well as impact the wettability of the cooling water on a solid surface. In electrode spray cooling, surfactant molecules may replace the water molecules at the solid-liquid interface between the electrode surface and the cooling liquid, and thus may create a higher concentration of surfactant molecules at the interfacial boundary. In terms of wettability, the presence of a surfactant may reduce the free energy of the cooling liquid, allow the cooling liquid to spread over the electrode surface, and displace air at the interfacial boundary. The displacement of air at the interfacial boundary will have at least three benefits: 1) closer contact between the electrode and the cooling liquid can improve the cooling capacity of the system due to enhanced conductive heat transfer; 2) formation of a thin film of cooling liquid on the electrode can reduce areas of the electrode that are exposed to atmospheric oxygen, thereby reducing oxidation potential; and 3) controlling the water boiling characteristics (i.e. nucleate and film boiling), thereby controlling the cooling dynamics of the cooling fluid. The cooling liquid can be predominantly water, e.g., more than 95 wt %, more than 99 wt %, or more than 99.5 wt %. In some embodiments, the water can be recycled process water or municipal water.

The method disclosed herein involves the application of a surfactant or a blend of surfactants, which can include anionic, cationic, non-ionic, and/or zwitterionic surfactants, including hydrocarbon chemistries, brominated hydrocarbon chemistries, and fluorinated hydrocarbon chemistries to the electrode cooling liquid to increase the wettability of the cooling water and to reduce the surface tension. For example, the surfactant can include a hydrophilic portion and a hydrophobic portion. The hydrophilic portion can include groups such as carboxylates ($-CO_2^-$), sulfonates ($-SO_3^-$), sulfates, and polyalkoxylates. The hydrophobic portion can include hydrocarbyl groups containing 10 to 40 carbon atoms, for example, stearyl, dodecyl, phenyl, and alkylphenyl groups. In some embodiments, the surfactant can contain alkylphenols, such as nonylphenol and octylphenol and isomers thereof, and alkoxylates (e.g., ethoxylates or propoxylates) thereof, such as nonylphenol ethoxylate (also known as nonylphenol polyethoxylate). Exemplary nonylphenol ethoxylates include Nonoxynol-4, Nonoxynol-7, Nonoxynol-9, Nonoxynol-14, Nonoxynol-15, Nonoxynol-18, Nonoxynol-40, Nonoxynol-30, Nonoxynol-50, polyethylene glycol (PEG)-7 Nonyl phenyl ether, PEG-14 Nonyl phenyl ether, PEG-18 Nonyl phenyl ether and PEG-50 Nonyl phenyl ether. An example of octylphenol ethoxylate is polyoxyethylene octyl phenyl ether.

In some embodiments, the surfactant is a mixture of an oxirane polymer and at least one alkylphenol. As used herein, the term "oxirane polymer" refers to a polymer made by polymerizing monomers such as ethylene oxide, propylene oxide, and combinations thereof. In some embodiments, the oxirane polymer is polyethylene oxide (also known as polyethylene glycol, PEG). In some embodiments, the oxirane polymer is polypropylene glycol (PPG). In some embodiments, the oxirane polymer is a copolymer of ethylene oxide and propylene oxide, and can be a random copolymer, or a block copolymer (e.g., a di-block copolymer or a tri-block copolymer). Exemplary tri-block copolymers include PEG-PPG-PEG and PPG-PEG-PPG. A molecular weight of the oxirane polymer can range from 300 g/mol to 500,000 g/mol, from 1,000 g/mol to 100,000 g/mol, or from 2,000 g/mol to 10,000 g/mol.

A ratio of the weight of the oxirane polymer to the weight of the total amount of alkylphenol present in the cooling liquid is in a range of from 1:100 to 100:1, from 1:50 to 50:1, or from 1:10 to 10:1. In one embodiment, the oxirane polymer and nonylphenol are applied to the electrode cooling water to form a cooling liquid.

The concentration of the surfactant in the cooling liquid can be present in the range of from 10 mg/l to 5,000 mg/l, from 50 mg/l to 1,000 mg/l, from 100 mg/l to 700 mg/l, or from 200 mg/l to 500 mg/l, or from 300 mg/l to 600 mg/l. In some aspects, a sufficient amount of surfactant is added to the cooling liquid to reduce the surface tension of the cooling liquid at room temperature (e.g., at 25° C.) to a range of from 54.9 mN/m to 69.5 mN/m, or from 58.5 mN/m to 65.8 mN/m, or from 60.0 mN/m to 63.0 mN/m. The surface tension of the cooling liquid may be measured by methods known to one skilled in the art, for example, ASTM D1331, which is incorporated herein by reference in its entirety.

Industrial application of this method indicates that an additional 1.5 to 40 percent, 2 to 30 percent, 5 to 20 percent, or 5 to 15 percent, or 2.5 to 15 percent electrode consumption is avoided through the implementation of this method. For example, the spraying of the cooling liquid can reduce oxidative electrode consumption by 1.5 to 30 percent as compared to a like method in which only water cools the furnace electrode. As would be appreciated in the art, a reduction in oxidative electrode consumption of even 1.5 percent is considered to be significant and can provide for substantial savings. In some embodiments, the reduction in electrode consumption is apparent within 24 hours of spraying the cooling liquid.

Electrode consumption is typically determined over a period of time. For example, in one embodiment, the electrode consumption is calculated as the consumption over one week period. In other embodiments, the consumption may be calculated over a two week period. In still other embodiments, the electrode consumption is calculated over a one month period. In still further embodiments, the consumption is calculated for periods longer than about 3 days. In some embodiments, the consumption is calculated daily, weekly, or monthly. Electrode consumption can be determined by methods known to one skilled in the art, for example, by measuring the value of the eddy current in the electrode, which can be correlated to the consumption rate. See U.S. Pat. No. 4,048,556 to Roach et al., which is incorporated herein by reference in its entirety. In some embodiments, actual electrode consumption can be measured in the process of replacing the furnace electrodes per ton of produced steel. For example, the number of heats of known mass of steel produced by the furnace (e.g., EAF or LMF) per electrode can be measured. As an another example, electrode consumption can be measured by removing the electrode, weighing the electrode, and repeating this process for other electrodes that are used within a specified time period.

Figure 1:
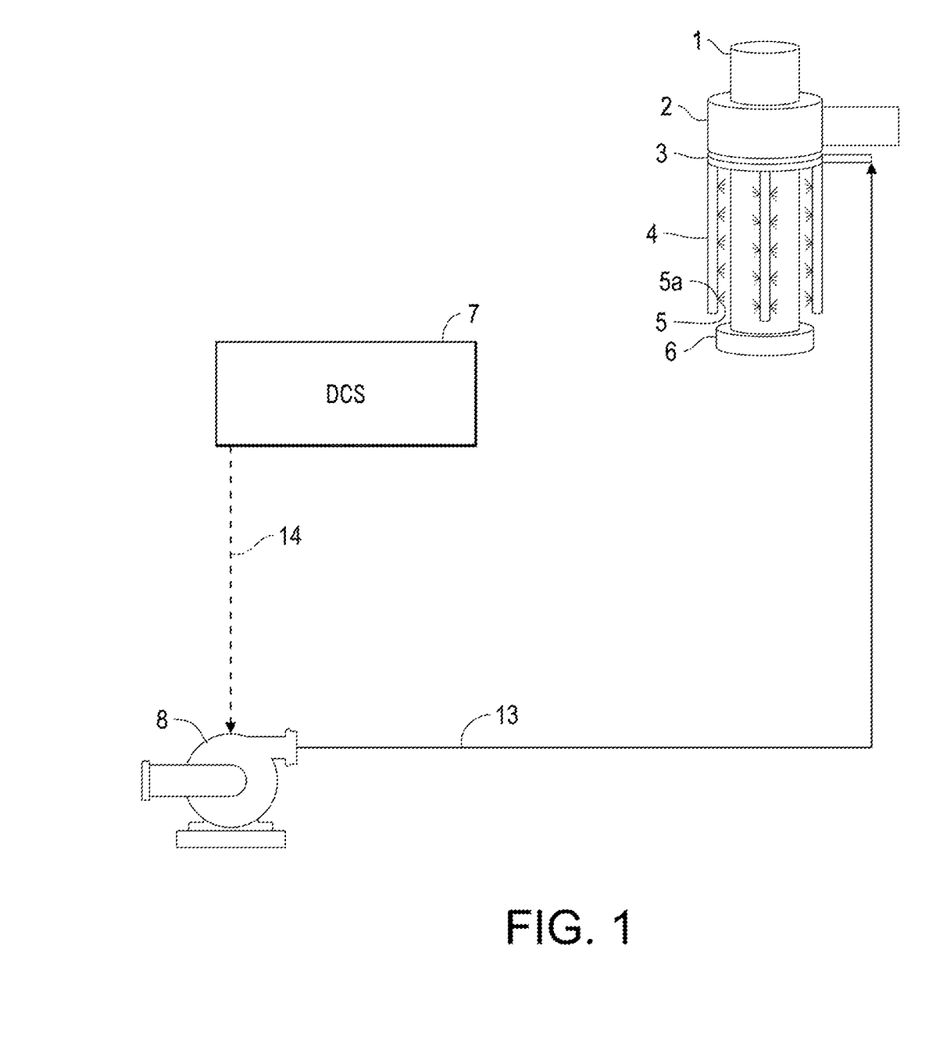
FIG. 1 is a schematic diagram illustrating a spray cooling system for a single electrode in a direct current furnace.

FIG. 1 illustrates an example of a spray cooling arrangement for a direct current furnace. The electrode holder 2 holds the graphite electrode 1 which extends into the furnace through the top of the furnace 6. The size of the graphite electrode 1 typically varies from 75 mm to 700 mm in diameter, although electrodes of up to 800 mm are available.

The spray cooling system (i.e., the cooling bank) has a circular ring distribution header 3 and a vertical spray distribution header 4. The vertical spray distribution header 4 includes a plurality of nozzles 5a from which the cooling liquid 5 is sprayed onto the outer circumference of the electrode 1. In this manner, the cooling of the electrode occurs from the electrode holder 2 to the top of the furnace 6. At the point of impingement, or where the cooling liquid meets the electrode surface, the temperature of the cooling liquid can be below the boiling point of the liquid. If cooling liquid enters the furnace during operation, it would evaporate prior to reaching the molten metal bath and avoid explosion.

In most embodiments, the cooling liquid is constantly applied to the electrodes. The application of cooling liquid can be generally held to below 4.5 m³/h for a 600-mm diameter electrode. Flow rates for smaller and larger electrodes can be varied based upon the surface coverage area. Depending on the application, the flow rate may vary from 0.25 m³/h to 10 m³/h, from 1 m³/h to 5 m³/h, or from 2 m³/h to 4 m³/h, for each electrode (i.e., phase). The cooling liquid can be sprayed in a direction orthogonal to the longitudinal axis of the graphite electrode 1, or at an downward or upward angle, e.g., of from 10° to 35° with respect to the horizontal. The cooling liquid can be sprayed with a jet pressure of from 0.5 to 3 kg/cm² and at a rate of from 0.8 to 6.0 l/minute, or up to 75 l/minute (about 20 gallons/minute), for each electrode. A sufficient amount of cooling liquid is sprayed at the electrode to keep the electrode cooled. In this process, a sufficient amount of the cooling liquid is applied to the surface of the furnace electrode so as to reduce the oxidative electrode consumption, as compared to a like method in which only water cools the furnace electrode. In some embodiments, a sufficient amount of the cooling liquid is applied to the surface of the furnace electrode so that the cooling liquid forms a film on the entire outer circumferential surface of the electrode.

When the spray of cooling liquid 5 contacts the hot surface of the graphite electrode 1, the cooling liquid evaporates to produce a cooling effect on at least the portion of the electrode 1 above the furnace. In some embodiments, the electrode 1 can be cooled uniformly over its entire length. Since the graphite electrode has excellent conductivity, when the upper portion of the graphite electrode 1 is cooled, the lower portion of the electrode 1 is also satisfactorily cooled, so that it is possible to attain a great reduction of the electrode consumption. In other words, the consumption of the electrode 1 due to oxidation can be suppressed.

In this embodiment, the surfactant and water can be pre-mixed offline to form a cooling liquid which is supplied to the flow path 13 via the pump 8 (e.g., a booster pump).

Figure 2:
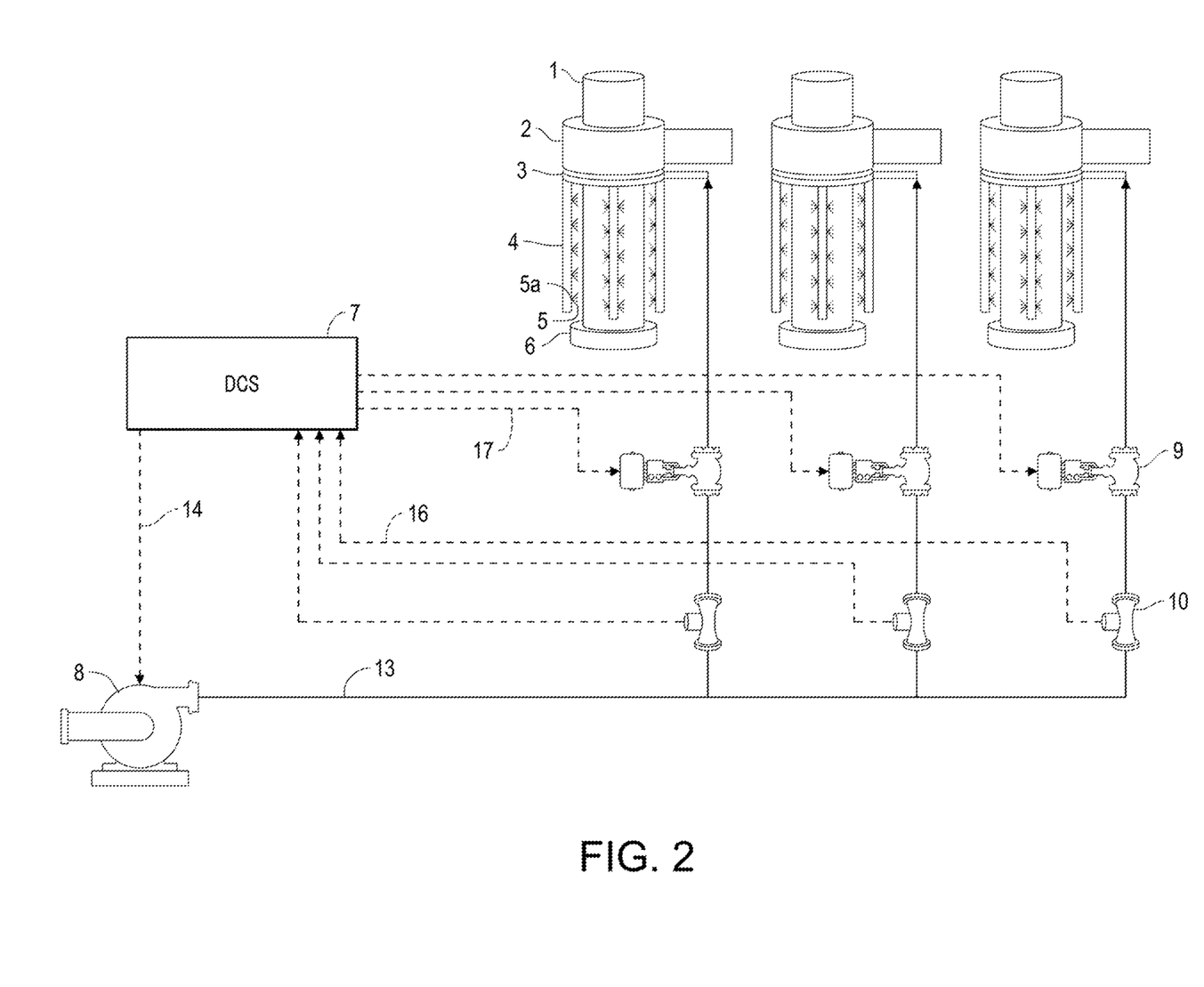
FIG. 2 is a schematic diagram illustrating a spray cooling system with feedback and control of individual electrode cooling banks for each of the three electrodes in an alternating current furnace.

FIG. 2 illustrates an example of the spray cooling arrangement for an alternating current furnace. There are three electrodes in the alternating current furnace, and each of the electrodes supply one of the electrical phases.

Similar to FIG. 1, FIG. 2 includes a flow path 13 that allows the cooling liquid to flow to the spray cooling system. A control valve 9 regulates the flow for spray cooling to an individual electrode, based upon feedback 17 from a distributed control system (DCS) 7. An in-line flow meter 10 measures the flow rate of cooling liquid and then sends a feedback 16 to the DCS 7 that actuates a pump 8 (e.g., a booster pump) to supply cooling liquid, which is pre-mixed offline. For example, the DCS 7 sends a feedback 14 to the pump 8 to supply the cooling liquid for cooling the electrodes. The parameters (e.g., electrode and spray parameters) for this spray cooling arrangement can be the same or substantially the same as those described for FIG. 1.

Figure 3:
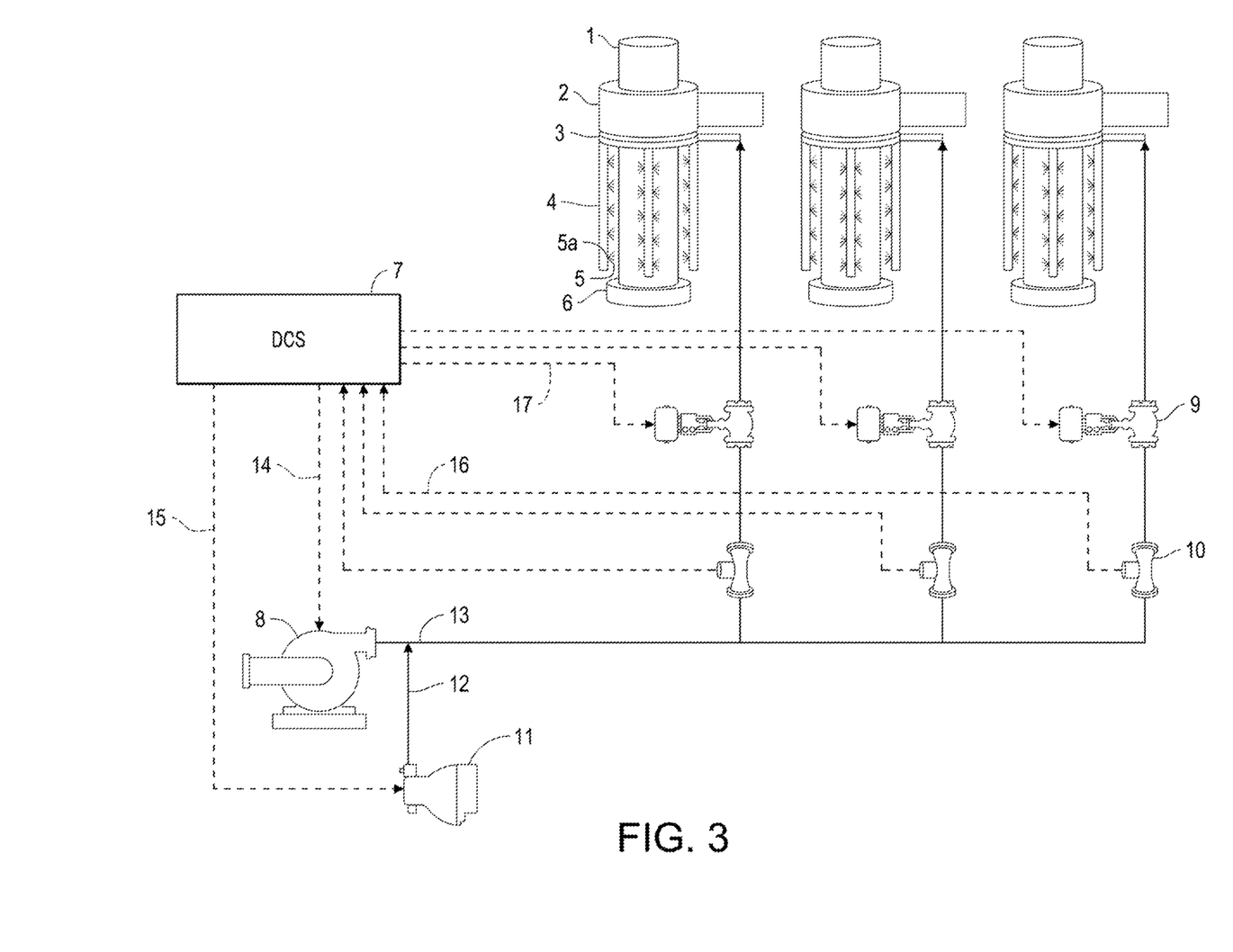
FIG. 3 is a schematic diagram illustrating a spray cooling system with feedback and control of individual electrode cooling banks and a chemical metering skid for the electrodes in an alternating current furnace.

FIG. 3 illustrates an example of the spray cooling arrangement for an alternating current furnace. In this embodiment, the spray cooling arrangement includes a chemical metering skid 11 to supply the surfactant in-line. The in-line flow meter 10 measures the flow rate of cooling liquid and then sends a feedback 16 to the DCS 7 that actuates: (i) a pump 8 (e.g., a booster pump) to supply cooling water, and (ii) a chemical metering skid 11 to supply the surfactant. For example, the DCS 7 can send a feedback 14 to the pump 8 to supply the cooling water, as described above in connection with FIG. 2. The DCS 7 can also perform the calculations and send a digital or an analogue feedback 15 to the chemical metering skid to supply the surfactant at an accurate and discrete dosage. The dosage and the timing between each dosage may be empirically determined. For example, the dosage and timing may depend on the furnace operation and the condition of the steel bath. The surfactant can be supplied from the chemical metering skid 11 in a neat form (if liquid) or as a concentrated solution. The surfactant can be introduced to (e.g., injected into) the flow path 13 at location 12, downstream of the pump 8. Supplying the surfactant at location 12 can allow the mixing of the surfactant with the water to form the cooling liquid for cooling the electrodes. In some embodiments, the surfactant is introduced to the flow path 13 at a location upstream of the pump 8. The parameters (e.g., electrode and spray parameters) for this spray cooling arrangement can be the same or substantially the same as those described for FIGS. 1 and 2.

Accordingly, the consumption of the electrodes can be reduced through the application of a surface-active agent (surfactant) in the electrode spray cooling liquid. The presence of the surfactant in the electrode spray cooling water increases the wettability of the water, reduces the surface tension, and changes the boiling characteristics of the water, thereby making a more uniform cooling film on the electrode 1 during operation. The more uniform film will reduce oxidation of the electrode, thereby reducing electrode consumption rate.

Utilization of surfactants in combination with an antioxidant (e.g., calcium phosphate, or polyphosphate) may enhance the performance of the cooling liquid and thus may further reduce the consumption rate of electrode. In some embodiments, the cooling liquid further comprises an antioxidant additive or a mixture of antioxidant additives of the amount and type described in U.S. Provisional Application No. 62/745,697, titled "Spray Cooling Furnace Electrodes With A Cooling Liquid That Contains Antioxidants," filed on Oct. 15, 2018; U.S. Provisional Application No. 62/779,457 titled "Method Of Protecting Furnace Electrodes With A Cooling Liquid That Contains An Antioxidant Additive," filed on Dec. 13, 2018; and U.S. patent application Ser. No. 16/559,099, titled "Methods Of Protecting Furnace Electrodes With Cooling Liquid That Contains An Additive," filed on Sep. 3, 2019, the entirety of each application is hereby incorporated by reference herein. The cooling liquid may include at least one antioxidant additive such as halides, nitrates, sulfates, silicates, phosphates and derivatives thereof, polyphosphates and derivatives thereof, borates, and the like. It is believed that a cooling liquid containing a combination of the surfactant and antioxidant additive can achieve a synergistic effect in reducing electrode consumption as compared to using a cooling liquid containing either the surfactant or the antioxidant additive.

Example 1

A cooling liquid containing water and surfactants (an oxirane polymer, e.g., a polyethylene oxide, and nonylphenol) was sprayed onto hot ultra-high-power (UHP) electrodes. Each electrode had a diameter of 400 mm. The cooling liquid contained a total surfactant amount of 250 mg/l of cooling liquid. The spray rate of the cooling fluid was dynamic and was based upon furnace conditions in operation. The spray rate ranged between 3 gallons and 20 gallons per minute per electrode during the heating of the electrode. Electrode consumption was reduced from 2.4 lb/ton (see Comparative Example 1) to 2.2 lb/ton over a two-week evaluation period.

Example 2

This example tested the effect of a second surfactant on the oxidative consumption of an electrode at a steel manufacturing site. The manufacturing steel site experiences an average electrode consumption rate of about 2.5-3.5 lb/ton. The reduction in electrode consumption was measured weekly and is shown in FIG. 4.

Figure 4:
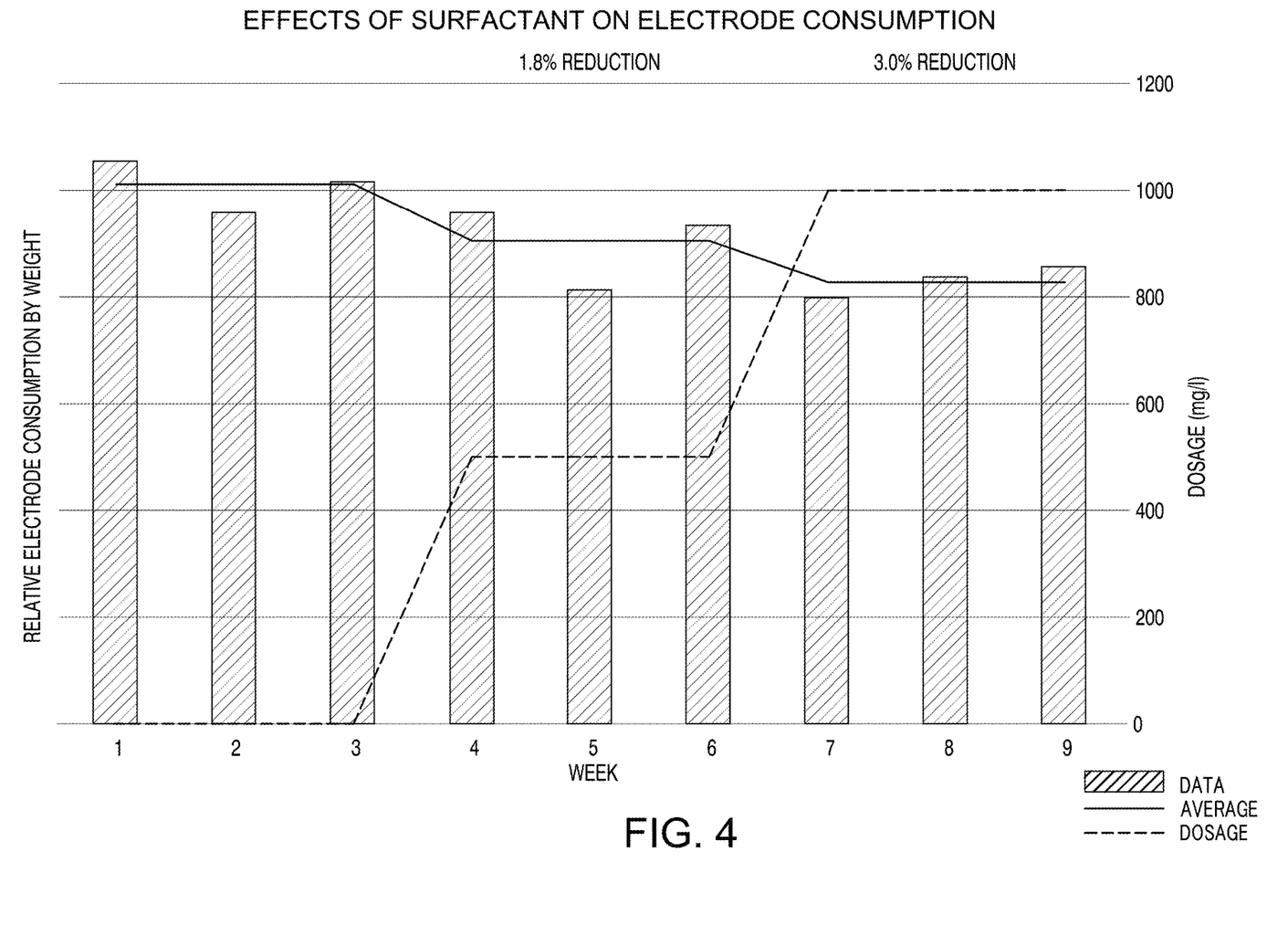
FIG. 4 is a graph showing the relative electrode consumption by weight of produced steel.

As shown in FIG. 4, the dosage of the surfactant is kept constant at 500 mg/L for weeks 4-6, and at 1,000 mg/L for weeks 7-9. In weeks 4-6, a reduction in electrode consumption of about 1.8% was observed. When the dosage of the surfactant was increased to 1,000 mg/L at weeks 7-9, a reduction in electrode consumption of about 3.0% was observed. Thus, at higher dosages, increasing levels of electrode protection were confirmed, and the sidewall oxidation of the electrode decreased.

Example 3

This example tested the effect of a surfactant on the oxidative consumption of an electrode at another steel manufacturing site. This surfactant is the same surfactant used in Example 2. The reduction in electrode consumption was measured daily and is shown in FIG. 5.

Figure 5:
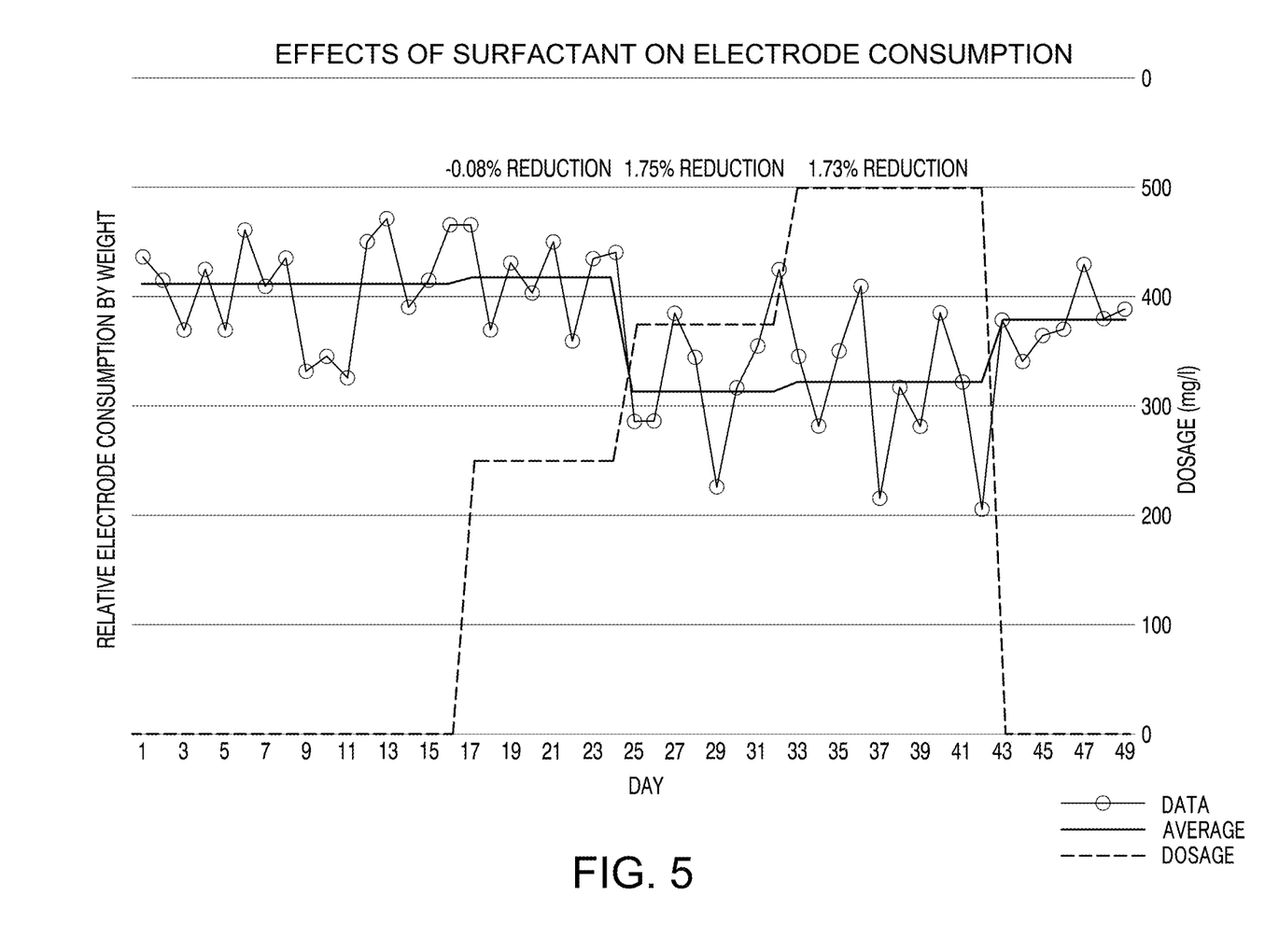
FIG. 5 is a graph showing the relative electrode consumption by weight of produced steel.

As shown in FIG. 5, the dosage of the surfactant is increased from 200 mg/L, to 300 mg/L, and finally to 400 mg/L. At a dosage of 300 mg/L, a reduction in electrode consumption of about 1.75% was observed. When the dosage of the surfactant was increased to 400 mg/L, the reduction in electrode consumption was about 1.73%. When no surfactant was used, the electrode consumption increased as compared to when the surfactant was present at dosages of 300 mg/L and 400 mg/L.

Comparative Example 1

A cooling liquid containing water only was sprayed onto hot ultra-high-power (UHP) electrodes. Each electrode had a diameter of 400 mm. The spray rate of the cooling liquid was dynamic and was based upon furnace conditions in operation. The spray rate ranged between 3 gallons and 20 gallons per minute per electrode during the heating of the electrode. The electrode consumption rate was determined to be 2.4 lb/ton over a two-week evaluation period.

It will be apparent to those skilled in the art that variations of the process described herein are possible and are intended to be encompassed within the scope of the present invention.

What is claimed is:

1. A method for cooling a furnace electrode, comprising:
    mixing a surfactant with water to form a cooling liquid so that the surfactant is present in the cooling liquid in an amount in a range of from 10 mg/l to 5,000 mg/l, and the surface tension of the cooling liquid is in a range of from 54.9 mN/m to 69.5 mN/m at room temperature, and
    spraying at least a surface of the furnace electrode disposed adjacent a furnace with the cooling liquid to cool the furnace electrode.

2. The method of claim 1, wherein the surfactant comprises nonylphenol or a nonylphenoxy group.

3. The method of claim 2, wherein the surfactant further comprises an oxirane polymer.

4. The method of claim 2, wherein the surfactant comprises nonylphenol.

5. The method of claim 1, wherein the surface tension of the cooling liquid is in a range of from 58.5 mN/m to 65.8 mN/m at room temperature.

6. The method of claim 1, wherein the surfactant is present in the cooling liquid in an amount in a range of from 50 mg/l to 1,000 mg/l.

7. The method of claim 1, wherein the surfactant is present in the cooling liquid in an amount in a range of from 100 mg/l to 700 mg/l.

8. The method of claim 1, wherein the surfactant is present in the cooling liquid in an amount in a range of from 300 mg/l to 600 mg/l.

9. The method of claim 1, wherein the furnace electrode is an electric arc furnace electrode or a ladle metallurgy furnace electrode.

10. The method of claim 1, wherein a sufficient amount of the cooling liquid is applied to the surface of the furnace electrode so that the oxidative electrode consumption is reduced as compared to a like method in which water having no surfactant cools the furnace electrode.

11. The method of claim 10, wherein the oxidative electrode consumption is reduced by 1.5 to 30 percent as compared to the like method.

12. The method of claim 1, wherein the surface of the furnace electrode is heated to a temperature of at least 700° C.

13. The method of claim 1, wherein the surface of the furnace electrode is heated to a temperature of at least 1200° C.

14. The method of claim 1, wherein the cooling liquid forms a film on the surface of the furnace electrode.

* * * * *